US011938724B2

(12) United States Patent
Sadakuni et al.

(10) Patent No.: US 11,938,724 B2
(45) Date of Patent: Mar. 26, 2024

(54) POST-PROCESSING DEVICE

(71) Applicant: SEIKO EPSON CORPORATION, Tokyo (JP)

(72) Inventors: Kei Sadakuni, Kiyosu (JP); Kenji Uchibori, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 209 days.

(21) Appl. No.: 17/653,358

(22) Filed: Mar. 3, 2022

(65) Prior Publication Data

US 2022/0281221 A1 Sep. 8, 2022

(30) Foreign Application Priority Data

Mar. 4, 2021 (JP) ................................ 2021-034806

(51) Int. Cl.
*B41J 2/045* (2006.01)
*B41J 11/42* (2006.01)

(52) U.S. Cl.
CPC ......... *B41J 2/04566* (2013.01); *B41J 2/0456* (2013.01); *B41J 2/04586* (2013.01); *B41J 11/42* (2013.01)

(58) Field of Classification Search
CPC .... B41J 13/0009; B41J 29/38; B41J 2/04536; B41J 11/42; B41J 2/0456; B41J 2/04566; B41J 2/04586; B65H 2801/27; B65H 2220/11; G03G 15/0194; G03G 15/0131; G03G 15/5058; G03G 2215/0158
See application file for complete search history.

(56) References Cited

U.S. PATENT DOCUMENTS

2014/0284863 A1* 9/2014 Matsumoto ............ B65H 43/08
270/1.01

FOREIGN PATENT DOCUMENTS

JP 2020-090375 A 6/2020

* cited by examiner

*Primary Examiner* — Thinh H Nguyen
(74) *Attorney, Agent, or Firm* — WORKMAN NYDEGGER

(57) ABSTRACT

A post-processing device includes a first discharge unit, a processing tray, an end alignment portion, a transport unit that comes into contact with an upperface of a medium placed on the processing tray and transports the medium to the end alignment portion, a position changing unit that changes the relative position of the transport unit with respect to the processing tray, a controller, and a post-processing unit that performs a post-process on the medium on the processing tray, wherein the position changing unit is configured to move the transport unit to a transport position to which the medium is transported and a standby position farther away from the processing tray than the transport position, wherein the controller changes the standby position based on the processing information related to the process performed on the medium, and wherein the processing information includes information about a process performed on the first medium.

7 Claims, 6 Drawing Sheets

POST-PROCESSING DEVICE

The present application is based on, and claims priority from JP Application Serial Number 2021-034806, filed Mar. 4, 2021, the disclosure of which is hereby incorporated by reference herein in its entirety.

BACKGROUND

1. Technical Field

The present disclosure relates to a post-processing device.

2. Related Art

For example, as in JP-A-2020-90375, a sheet processing device which is an example of a post-processing device which performs a post-process on a sheet which is an example of a medium on which an image is formed is known. The sheet processing device includes a discharge roller which is an example of a discharge unit, a processing tray on which discharged sheets are stacked, a knurled belt which is an example of a transport unit that transports sheets on the processing tray, and a sheet end regulating member which is an end alignment portion.

The knurled belt receives the sheet at a standby position away from the sheet, and transports the received sheet by rotating at an operating position which is an example of a transport position in contact with the sheet. The knurled belt aligns the sheets by transporting the sheets and causing the sheet to come into contact with the sheet end regulating member.

The sheet on which the image is formed may curl. When the curled sheet hits the knurled belt located in the standby position, the image formed on the sheet may be scratched. Therefore, the sheet processing device changes the standby position of the knurled belt according to the amount of curl of the sheet discharged by the discharge roller.

The medium may be placed on the processing tray in a curled state. When a second medium discharged from the discharge unit is placed on a first medium placed on the processing tray, the curl of the first medium may affect the second medium. That is, when the first medium is curled, the second medium may be deformed along the first medium and hit the transport unit even when the second medium is not curled, and the image may be scratched.

SUMMARY

According to an aspect of the present disclosure, a post-processing device includes a discharge unit that discharges a medium on which recording is performed by a recording unit that performs recording by ejecting a liquid, a processing tray on which the medium discharged by the discharge unit is placed, an end alignment portion that is provided on the processing tray and aligns an end of the medium, a transport unit that comes into contact with an upperface of the medium placed on the processing tray and transports the medium to the end alignment portion, a position changing unit that changes a relative position of the transport unit with respect to the processing tray, a controller that controls the position changing unit, and a post-processing unit that performs a post-process on the medium on the processing tray, wherein the position changing unit is configured to move the transport unit to a transport position to which the medium is transported and a standby position farther away from the processing tray than the transport position, wherein the controller changes the standby position based on processing information about a process performed on the medium, and wherein the processing information includes, among a first medium after alignment and a second medium before alignment, information about a process performed on the first medium.

DESCRIPTION OF EXEMPLARY EMBODIMENTS

First Embodiment

Recording System

Figure 1:
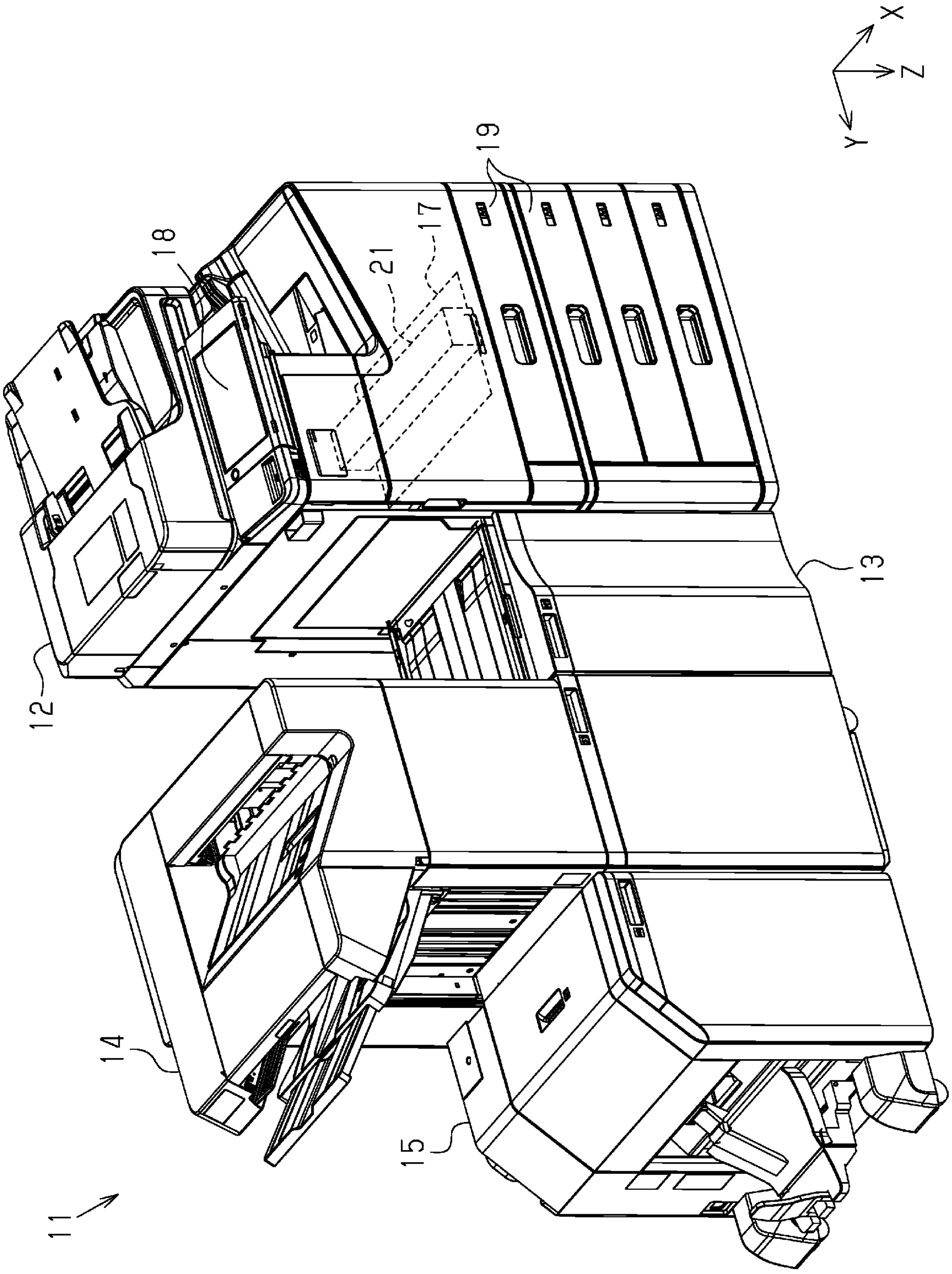
FIG. 1 is a perspective view showing a first embodiment of a recording system including a post-processing device.

Hereinafter, the first embodiment of the recording system including the post-processing device will be described with reference to the drawings.

In the drawings, the direction of gravity is indicated by the Z axis, and the directions along the horizontal plane are indicated by the X axis and the Y axis, assuming that a recording system 11 is placed on the horizontal plane. The X axis, the Y axis, and the Z axis are orthogonal to each other. In the following description, the direction parallel to the X axis is referred to as a width direction X, the direction parallel to the Y axis is referred to as a transport direction Y, and the direction parallel to the Z axis is also referred to as a vertical direction Z.

As shown in FIG. 1, the recording system 11 includes a recording device 12, an intermediate device 13, a post-processing device 14, and a middle folding device 15 that are provided side by side in the transport direction Y. The recording device 12, the intermediate device 13, the post-processing device 14, and the middle folding device 15 are provided adjacent to each other.

The recording device 12 is, for example, an ink jet printer that records an image by ejecting ink, which is an example of a liquid, onto a medium 17. The image is formed by the liquid adhering to the medium 17. The images include photographs, patterns, letters, symbols, marks, lines, tables and the like.

The recording device 12 may include an operation unit 18 such as a touch panel for operating the recording device 12 and the recording system 11, and a medium accommodating unit 19 capable of accommodating the media 17 in a stacked state. The recording device 12 may include a plurality of medium accommodating units 19.

The recording device 12 includes a recording unit 21 that performs recording by ejecting a liquid. The recording unit 21 performs recording on the media 17 sent out one by one from the medium accommodating unit 19. The recording unit 21 of the present embodiment is a line type provided over the width direction X of the medium 17. The recording unit 21 may be configured as a serial type that performs recording while moving in the width direction X of the medium 17.

The recording device 12 can perform single-sided recording in which recording is performed on only one side of the medium 17 and double-sided recording in which recording is performed on both sides of the medium 17. When performing single-sided recording, the recording device 12 performs recording on the upperface of the medium 17 and then sends the medium 17 to the intermediate device 13. When performing double-sided recording, the recording device 12 performs recording on the upperface of the medium 17, then inverts the medium 17 and returns it to the recording unit 21, and performs recording on the underface of the medium 17. The recording device 12 sends the medium 17 whose both sides recording is performed on to the intermediate device 13.

The intermediate device 13 sends the medium 17 whose one side or both sides recording is performed on to the post-processing device 14. When performing the middle folding process of folding the recorded medium 17 in half, the post-processing device 14 sends the medium 17 to the middle folding device 15. The middle folding device 15 may perform saddle-stitching process on the medium 17 by binding the center of the medium 17 with staples.

Post-Processing Device

Figure 2:
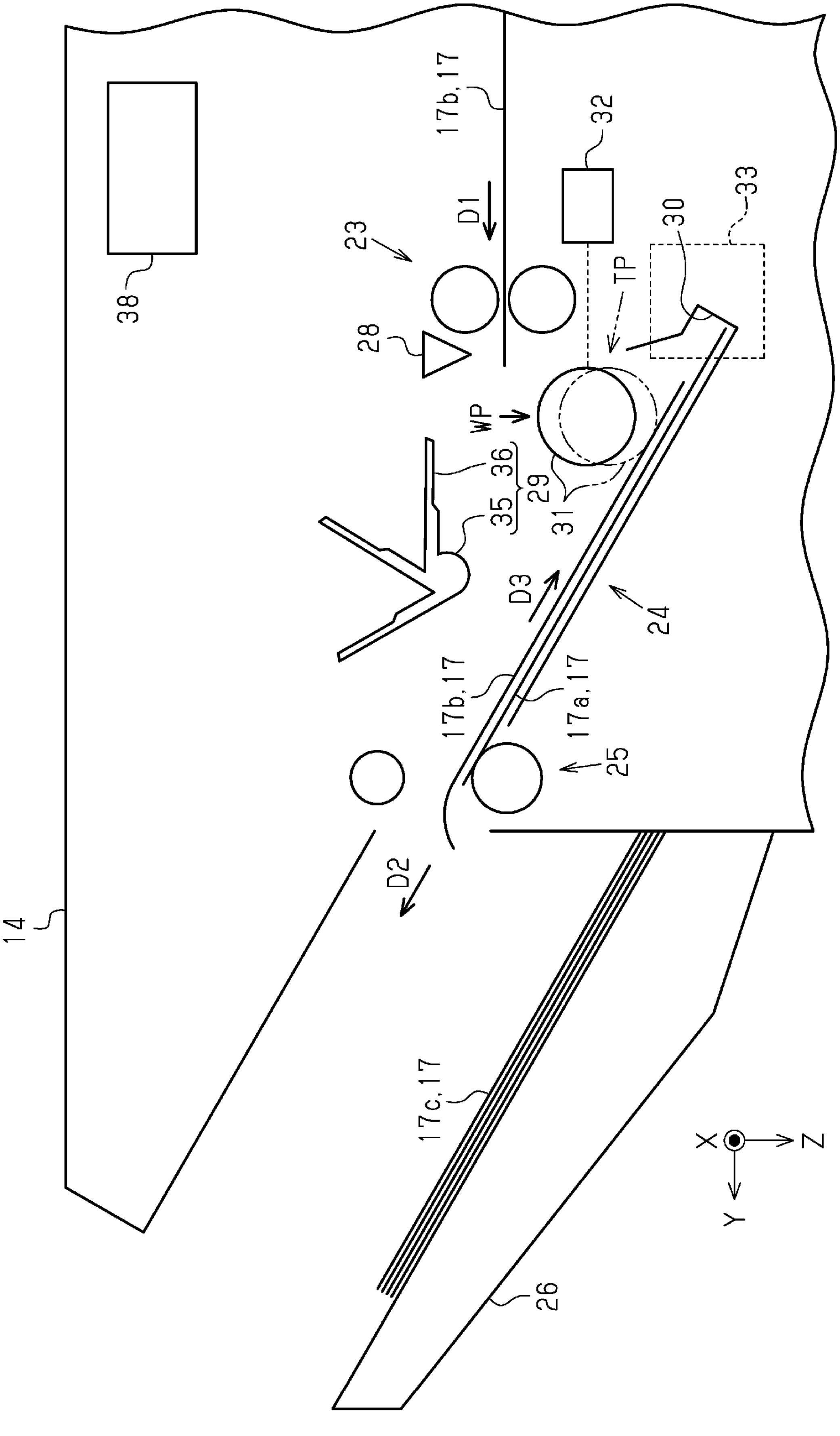
FIG. 2 is a schematic diagram of the post-processing device.

As shown in FIG. 2, the post-processing device 14 includes a first discharge unit 23, which is an example of a discharge unit that discharges the medium 17 on which the recording unit 21 performs recording, and a processing tray 24 on which the medium 17 discharged by the first discharge unit 23 is placed. The post-processing device 14 may include a second discharge unit 25 that discharges the medium 17 placed on the processing tray 24, and a stack tray 26 on which the medium 17 discharged by the second discharge unit 25 is placed.

The first discharge unit 23 and the second discharge unit 25 may each be composed of a pair of rollers. Each of the first discharge unit 23 and the second discharge unit 25 discharge the medium 17 by rotating with the medium 17 interposed between rollers.

In the present embodiment, the medium after alignment 17 placed on the processing tray 24 is referred to as a first medium 17*a*, the medium before alignment 17 discharged by the first discharge unit 23 is referred to as a second medium 17*b*, and the medium 17 placed on the stack tray 26 is referred to as a third medium 17*c*. The first discharge unit 23 discharges the second medium 17*b* in a first discharge direction D1. The second discharge unit 25 discharges the first medium 17*a* in a second discharge direction D2.

The processing tray 24 is located downstream of the first discharge unit 23 in the first discharge direction D1 and at least part thereof is located below the first discharge unit 23 in the vertical direction Z. Therefore, the processing tray 24 receives the second medium 17*b* that is discharged by the first discharge unit 23 and falls. The second medium 17*b* becomes the first medium 17*a* by being aligned on the processing tray 24. That is, the second medium 17*b* discharged from the first discharge unit 23 is regarded as the first medium 17*a* by being placed on the processing tray 24 and aligned.

The stack tray 26 is located downstream of the second discharge unit 25 in the second discharge direction D2, and at least part thereof is located below the second discharge unit 25 in the vertical direction Z. Therefore, the stack tray 26 receives the first medium 17*a* that is discharged by the second discharge unit 25 and falls. The first medium 17*a* is regarded as the third medium 17*c* by being placed on the stack tray 26.

The post-processing device 14 may include a detection unit 28 capable of detecting the second medium 17*b*, and a paddle 29 provided downstream of the first discharge unit 23 in the first discharge direction D1. The post-processing device 14 includes an end alignment portion 30 provided on the processing tray 24, and a transport unit 31 that transports the medium 17 to the end alignment portion 30. The post-processing device 14 includes a position changing unit 32 that changes the relative position of the transport unit 31 with respect to the processing tray 24, and a post-processing unit 33 that performs a post-process on the medium 17 on the processing tray 24.

The paddle 29 is located above the processing tray 24. The paddle 29 includes a rotating shaft 35 and at least one blade 36. The paddle 29 of the present embodiment has three blades 36. The blade 36 is, for example, a plate-shaped member having elasticity. The blade 36 rotates integrally with the rotating shaft 35.

The transport unit 31 may be configured by, for example, a knurled belt. The knurled belt is a belt having irregularities on its front face, and the frictional force between the knurled belt and the other party in contact with the knurled belt is higher than that of a belt having a flat face.

The position changing unit 32 moves at least one of the processing tray 24 and the transport unit 31. The position changing unit 32 of the present embodiment moves the transport unit 31. The position changing unit 32 is configured to move the transport unit 31 to a transport position TP shown by the chain double-dashed line in FIG. 2 and a standby position WP shown by the solid line in FIG. 2.

The transport position TP is a position where the transport unit 31 transports the second medium 17*b*. The transport unit 31 located at the transport position TP comes into contact with the second medium 17*b* and sandwiches the first medium 17*a* and the second medium 17*b* between the processing tray 24 and the transport unit 31. When the first medium 17*a* is not placed on the processing tray 24, the transport unit 31 sandwiches the second medium 17*b* between the processing tray 24 and the transport unit 31.

The transport unit 31 located at the transport position TP rotates in the counterclockwise direction in FIG. 2 to transport the second medium 17*b* in an alignment direction D3. The alignment direction D3 is a direction parallel to the face, of the processing tray 24, on which the first medium 17*a* is placed. The end alignment portion 30 is located at the downstream end of the processing tray 24 in the alignment direction D3. The transport unit 31 makes the second medium 17*b* contact the end alignment portion 30 to align the second medium 17*b*.

In other words, the end alignment portion 30 aligns an end of the second medium 17*b* transported by the transport unit 31. Alignment in the present embodiment means that the downstream end of the second medium 17*b* in the alignment direction D3 is aligned with the end alignment portion 30. When the first medium 17*a* is placed on the processing tray 24, the end of the first medium 17*a* and the end of the second medium 17*b* are aligned by aligning the second medium 17*b*. Since the second medium 17*b* is regarded as the first medium 17*a* by being aligned, a plurality of first media 17*a* is stacked on the processing tray 24 with the downstream end of the alignment direction D3 aligned.

The standby position WP is a position farther away from the processing tray 24 than the transport position TP. The standby position WP is a position above the transport position TP. The transport unit 31 located at the standby position WP is away from the first medium 17*a* and releases the restraint of the first medium 17*a*.

The post-processing device 14 of the present embodiment performs a staple process on the first medium 17*a*. The staple process is a process of binding a plurality of first media 17*a* with staples. The post-processing device 14 may perform a punching process, a shift process, and the like. The punching process is a process of punching a hole in one or a plurality of first media 17*a*. The shift process is a process of discharging the first media 17*a* in units to the stack tray 26 and discharging the first media 17*a* by shifting the position of each unit.

The post-processing device 14 includes a controller 38. The controller 38 may comprehensively control the drive of respective mechanisms in the post-processing device 14, and may control various operations performed by the post-processing device 14. The controller 38 can be configured as a circuit including α: one or a plurality of processors that performs various processes according to computer programs, β: one or a plurality of dedicated hardware circuits such as an integrated circuit, for a specific application, that performs at least part of the various processes, or γ: a combination thereof. The processor includes a CPU and a memory such as a RAM and a ROM, and the memory stores a program code or an instruction configured to cause the CPU to execute a process. The memory, that is, a computer-readable medium, includes any readable medium that can be accessed by a general-purpose or dedicated computer.

The controller 38 changes the standby position WP by controlling the position changing unit 32. Specifically, the controller 38 changes the standby position WP based on the processing information about the process performed on the medium 17.

Processing Information

The processing information includes information about a process performed on at least the first medium 17*a* of the first medium after alignment 17*a* and the second medium before alignment 17*b*.

The processing information may include the recording density in the recording process performed by the recording unit 21 on the medium 17. The recording density is the ratio of the area for recording an image to the area of the medium 17. In other words, it is the ratio of the number of dots of the ink actually applied the medium 17 to the maximum number of dots of the ink that can be applied to the medium 17. The processing information may individually include the recording densities of the upperface and the underface of each medium 17, or may include a value calculated from the recording densities.

The processing information may include a first recording density of the first medium 17*a* and a second recording density of the second medium 17*b*. Each of the first recording density and the second recording density may include the recording densities of the upperface and the underface. That is, the first recording density may include the upperface recording density of the upperface of the first medium 17*a* and the underface recording density of the underface of the first medium 17*a*. The second recording density may include the upperface recording density of the upperface of the second medium 17*b* and the underface recording density of the underface of the second medium 17*b*.

The first discharge unit 23 of the present embodiment discharges the second medium 17*b* whose only one side recording is performed on with the only one side facing down. Therefore, for each of the first medium 17*a* and the second medium 17*b* where recording is performed on one side, the underface is a face on which recording is performed and the upperface is a face on which recording is not performed. The upperface recording density of the upperface of each of the first medium 17*a* and the second medium 17*b* where recording is performed on one side is 0%.

The processing information may include the number of the first media 17*a* placed on the processing tray 24. The post-processing unit 33 of the present embodiment performs a post-process on the first media 17*a* for the number of sheets to be processed placed on the processing tray 24. Therefore, the number of the first media 17*a* is an example of information about a post-process performed on the first medium 17*a*.

The processing information may include the elapsed time elapsed since the recording unit 21 performed recording on the first medium 17*a*. That is, the elapsed time is a time it takes to perform a series of processes in which the recorded medium 17 on which recording is performed is transported to the post-processing device 14, is discharged from the first discharge unit 23 as the second medium 17*b*, and is aligned to become the first medium 17*a*. The elapsed time of the present embodiment is a time elapsed since performing recording on the first medium 17*a* located at the top of the plurality of first media 17*a* placed on the processing tray 24.

The processing information may include humidity information about humidity. For example, humidity information is the ratio of the amount of water vapor contained in the air to the amount of saturated water vapor. The amount of saturated water vapor changes depending on the temperature. Therefore, the processing information may include temperature information about the temperature of the environment in which the post-processing device 14 is installed. When the temperature is high, the amount of saturated water vapor is higher than that when the temperature is low. When the humidity is high, the amount of water vapor is higher than that when the humidity is low. Therefore, when the temperature and humidity are high, the amount of water vapor contained in the air is larger than that when the temperature and humidity are low.

The post-processing device 14 may include a measuring instrument (not shown) capable of measuring at least one of air temperature and humidity. The measuring instrument may be provided separately from the post-processing device 14. The temperature information and the humidity information may be input by the operation of the operation unit 18. The controller 38 may acquire temperature information and humidity information from the measuring instrument, the operation unit 18, and an external device such as a server.

Alignment Routine

Figure 3:
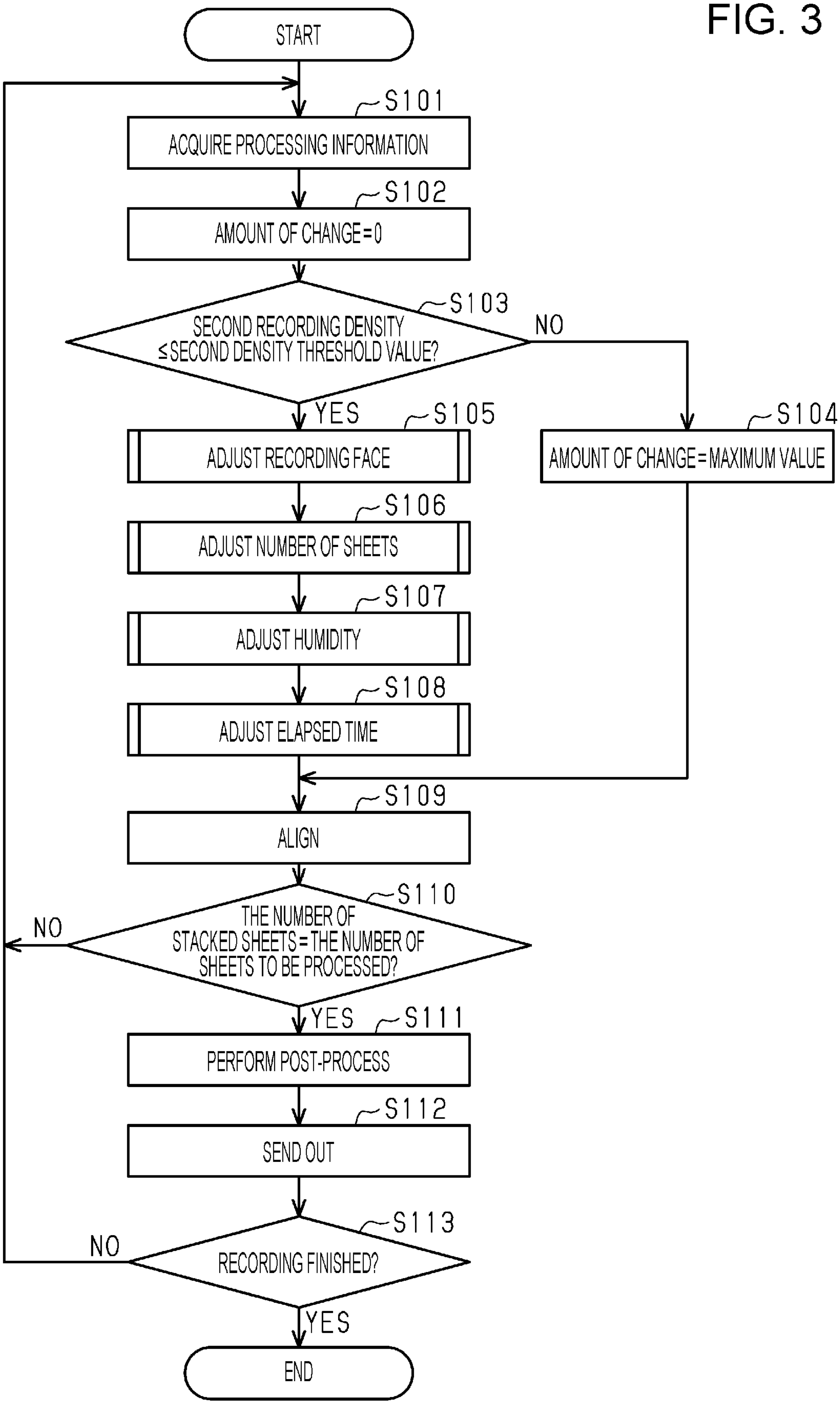
FIG. 3 is a flowchart showing an alignment routine of the first embodiment.

The alignment routine will be described with reference to the flowchart shown in FIG. 3. This alignment routine is performed at the timing when a recording instruction with post-processing is input. The second density threshold value used for comparison in the alignment routine is set in advance from, for example, experimental results.

In step S101, the controller 38 acquires the processing information. That is, the controller 38 acquires the first recording density, the second recording density, the number of stacked sheets, the humidity, the air temperature, and the elapsed time that are included in the processing information.

In step S102, the controller 38 resets the amount of change of the standby position WP to zero. In step S103, the controller 38 compares the second recording density with the second density threshold value. The second recording density includes the upperface recording density of the second medium 17*b* and the underface recording density of the second medium 17*b*. In step S103, the controller 38 compares the higher recording density, as the second recording density, of the upperface recording density and the underface recording density with the second density threshold value.

When the second recording density is larger than the second density threshold value in step S103, step S103 is NO, and the controller 38 advances the process to step S104. In step S104, the controller 38 sets the amount of change of the standby position WP to the maximum value, and advances the process to step S109.

In step S103, when the second recording density is equal to or lower than the second density threshold value, step S103 is YES, and the controller 38 advances the process to step S105. In step S105, the controller 38 performs the recording face adjustment subroutine shown in FIG. 4. In step S106, the controller 38 performs the sheet number adjustment subroutine shown in FIG. 5. In step S107, the controller 38 performs the humidity adjustment subroutine shown in FIG. 6. In step S108, the controller 38 performs the elapsed time adjustment subroutine shown in FIG. 7.

In step S109, the controller 38 rotates the transport unit 31 to align the second medium 17*b*. The second medium 17*b* becomes the first medium 17*a* by being aligned. In step S110, the controller 38 determines whether the stacked sheet number of the first media 17*a* placed on the processing tray 24 has reached the number of sheets to be processed, which is the number of sheets as a unit for post-processing. When the number of stacked sheets is insufficient for the number of sheets to be processed, step S110 is NO, and the controller 38 advances the process to step S101. In step S101, the controller 38 acquires the processing information. That is, the controller 38 reacquires the upperface recording density of the previous second medium 17*b* as the upperface recording density of the next first medium 17*a*, and reacquires the underface recording density of the previous second medium 17*b* as the underface recording density of the next first medium 17*a*.

When the number of stacked sheets reaches the number of sheets to be processed, step S110 is YES, and the controller 38 advances the process to step S111. In step S111, the controller 38 causes the post-processing unit 33 to perform a post-process on the plurality of first media 17*a* on the processing tray 24. In step S112, the controller 38 sends out the plurality of post-processed first media 17*a* from the processing tray 24 to the stack tray 26. As a result, the stacked sheet number of the first media 17*a* placed on the processing tray 24 is zero.

In step S113, the controller 38 determines whether the recording is completed. When there is a second medium 17*b* that has not been discharged from the first discharge unit 23, step S113 is NO, and the controller 38 advances the process to step S101. When all the media 17 on which recording is performed are sent out to the stack tray 26, step S113 is YES, and the controller 38 ends the alignment routine.

Recording Face Adjustment Subroutine

Figure 4:
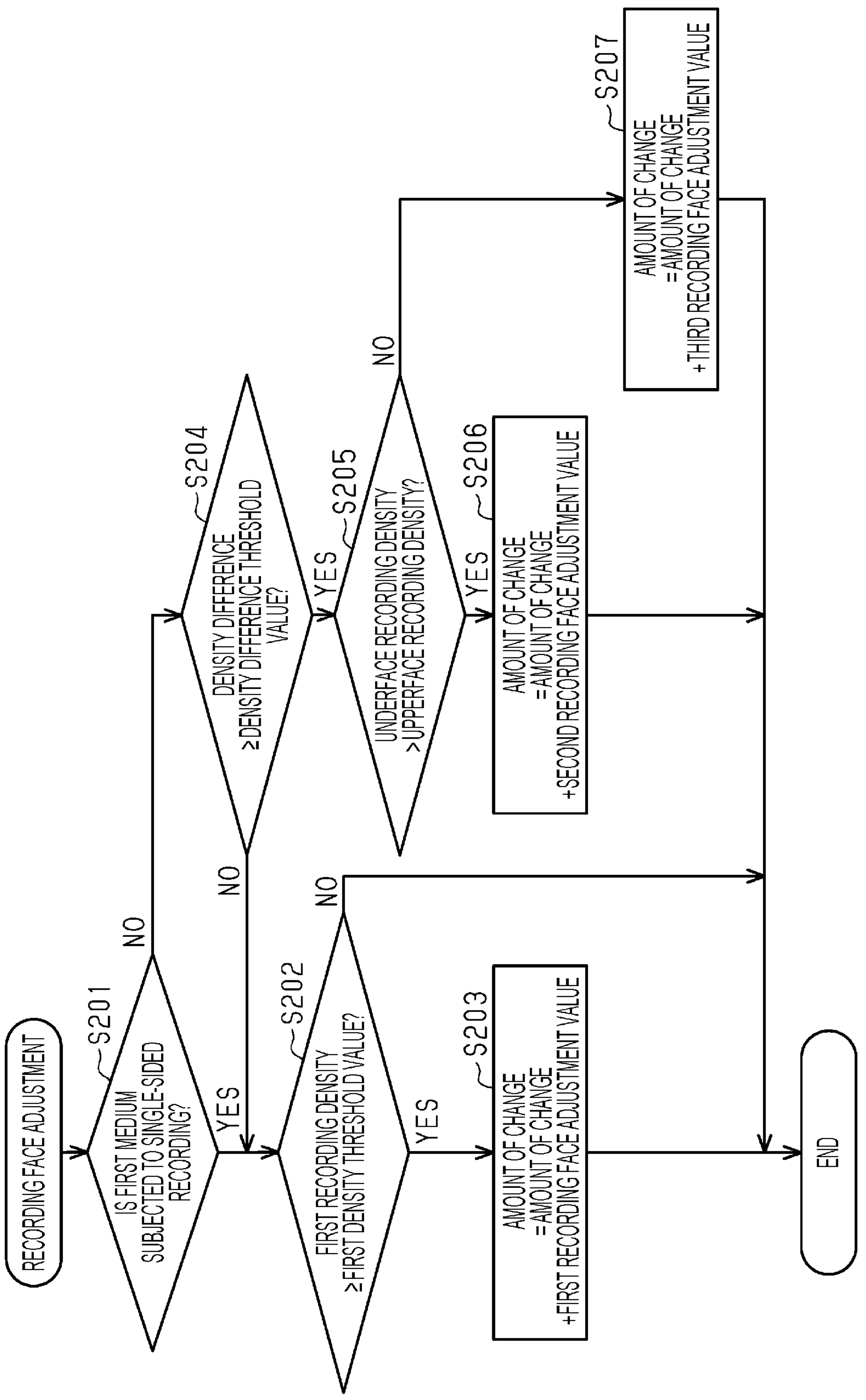
FIG. 4 is a flowchart showing a recording face adjustment subroutine performed by the alignment routine.

The recording face adjustment subroutine will be described with reference to the flowchart shown in FIG. 4. The first density threshold value and the density difference threshold value used for comparison in the recording face adjustment subroutine are set in advance from, for example, experimental results.

In step S201, the controller 38 determines whether the top first medium 17*a* among the first media 17*a* placed on the processing tray 24 is subjected to single-sided recording or double-sided recording. In the case of single-sided recording, step S201 is YES, and the controller 38 advances the process to step S202.

In step S202, the controller 38 compares the first recording density with the first density threshold value. Specifically, the controller 38 compares the higher one, as the first recording density, of the upperface recording density and the underface recording density of the first medium 17*a* with the first density threshold value. In the case of single-sided recording, since the upperface recording density is 0%, the controller 38 compares the underface recording density with the first density threshold value.

When the first recording density is equal to or higher than the first density threshold value, step S202 is YES, and the controller 38 advances the process to step S203. In step S203, the controller 38 adds the first recording face adjustment value to the amount of change. When the first recording density is less than the first density threshold value, step S202 is NO, and the controller 38 ends the process.

In step S201, when the first medium 17*a* is subjected to double-sided recording, step S201 is NO, and the controller 38 advances the process to step S204. In step S204, the controller 38 compares a difference in density which is a difference between the upperface recording density and the underface recording density of the first medium 17*a* with the density difference threshold value.

When the difference in density is less than the density difference threshold value, step S204 is NO, and the controller 38 advances the process to step S202. When the difference in density is equal to or greater than the density difference threshold value, step S204 is YES, and the controller 38 advances the process to step S205. In step S205, the controller 38 compares the underface recording density with the upperface recording density of the first medium 17*a*.

When the underface recording density is higher than the upperface recording density, step S205 is YES, and the controller 38 advances the process to step S206. In step S206, the controller 38 adds the second recording face adjustment value to the amount of change, and ends the process. The second recording face adjustment value may be equal to or less than the first recording face adjustment value.

When the underface recording density is equal to or lower than the upperface recording density, step S205 is NO, and the controller 38 advances the process to step S207. In step S207, the controller 38 adds the third recording face adjustment value to the amount of change, and ends the process. The third recording face adjustment value may be equal to or less than the second recording face adjustment value.

Sheet Number Adjustment Subroutine

Figure 5:
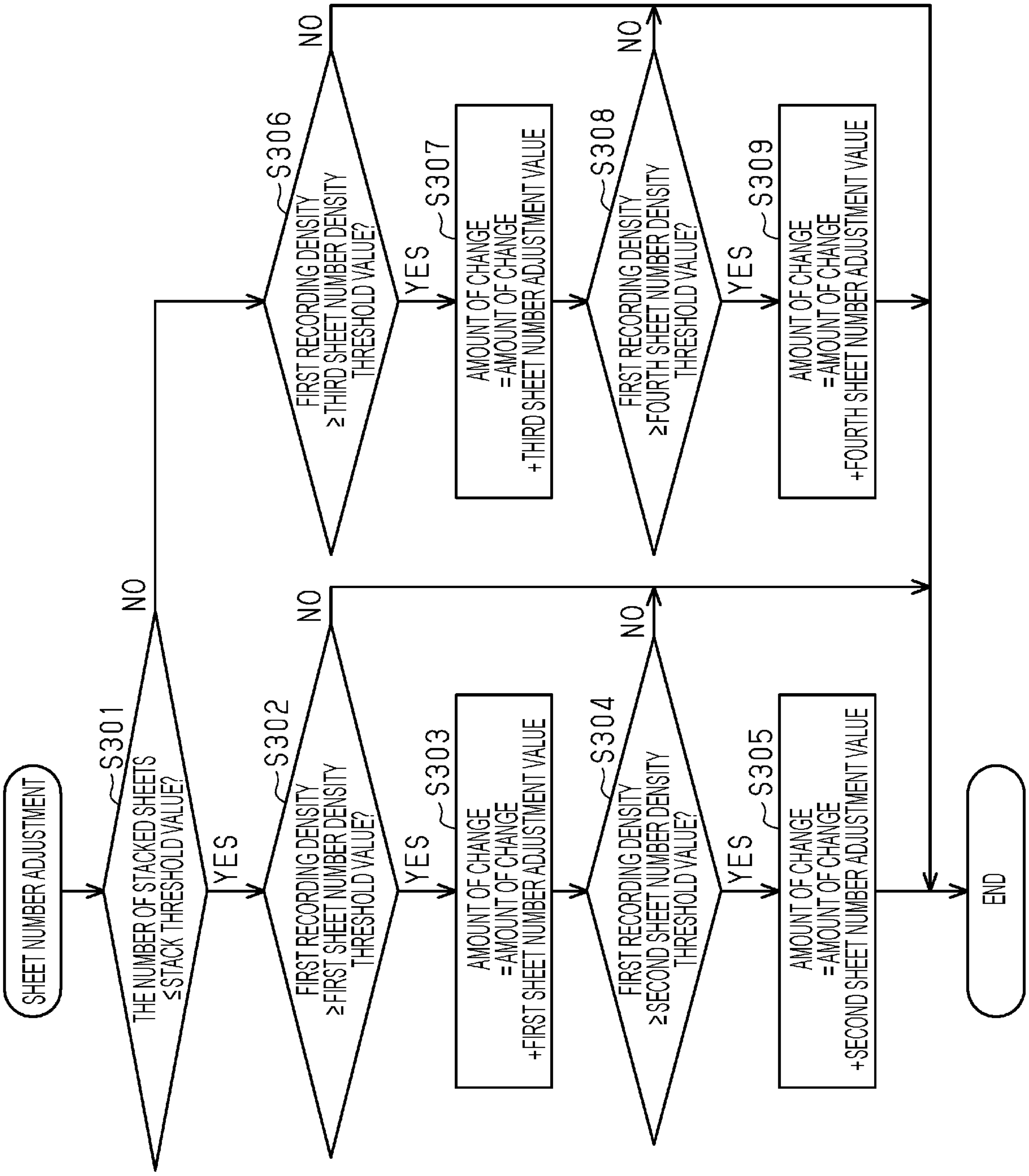
FIG. 5 is a flowchart showing a sheet number adjustment subroutine performed by the alignment routine.

The sheet number adjustment subroutine will be described with reference to the flowchart shown in FIG. 5. The stack threshold value and the plural sheet number density threshold values used for comparison in the sheet number adjustment subroutine are set in advance from, for example, experimental results. The first recording density is the higher recording density of the upperface recording density and the underface recording density of the first medium 17*a*.

In step S301, the controller 38 compares the stacked sheet number of the first media 17*a* placed on the processing tray 24 with the stack threshold value. When the number of stacked sheets is equal to or less than the stack threshold value, step S301 is YES, and the controller 38 advances the process to step S302. In step S302, the controller 38 compares the first recording density with the first sheet number density threshold value.

When the first recording density is lower than the first sheet number density threshold value, step S302 is NO, and the controller 38 ends the process. When the first recording density is equal to or higher than the first sheet number density threshold value, step S302 is YES, and the controller 38 advances the process to step S303. In step S303, the controller 38 adds a first sheet number adjustment value to the amount of change.

In step S304, the controller 38 compares the first recording density with the second sheet number density threshold value. When the first recording density is lower than the second sheet number density threshold value, step S304 is NO, and the controller 38 ends the process. When the first recording density is equal to or higher than the second sheet number density threshold value, step S304 is YES, and the controller 38 advances the process to step S305. In step S305, the controller 38 adds a second sheet number adjustment value to the amount of change, and ends the process.

In step S301, when the number of stacked sheets is larger than the stack threshold value, step S301 is NO, and the controller 38 advances the process to step S306. In step S306, the controller 38 compares the first recording density with the third sheet number density threshold value.

When the first recording density is lower than the third sheet number density threshold value, step S306 is NO, and the controller 38 ends the process. When the first recording density is equal to or higher than the third sheet number density threshold value, step S306 is YES, and the controller 38 advances the process to step S307. In step S307, the controller 38 adds a third sheet number adjustment value to the amount of change.

In step S308, the controller 38 compares the first recording density with a fourth sheet number density threshold value. When the first recording density is lower than the fourth sheet number density threshold value, step S308 is NO, and the controller 38 ends the process. When the first recording density is equal to or higher than the fourth sheet number density threshold value, step S308 is YES, and the controller 38 advances the process to step S309. In step S309, the controller 38 adds a fourth sheet number adjustment value to the amount of change.

Humidity Adjustment Subroutine

Figure 6:
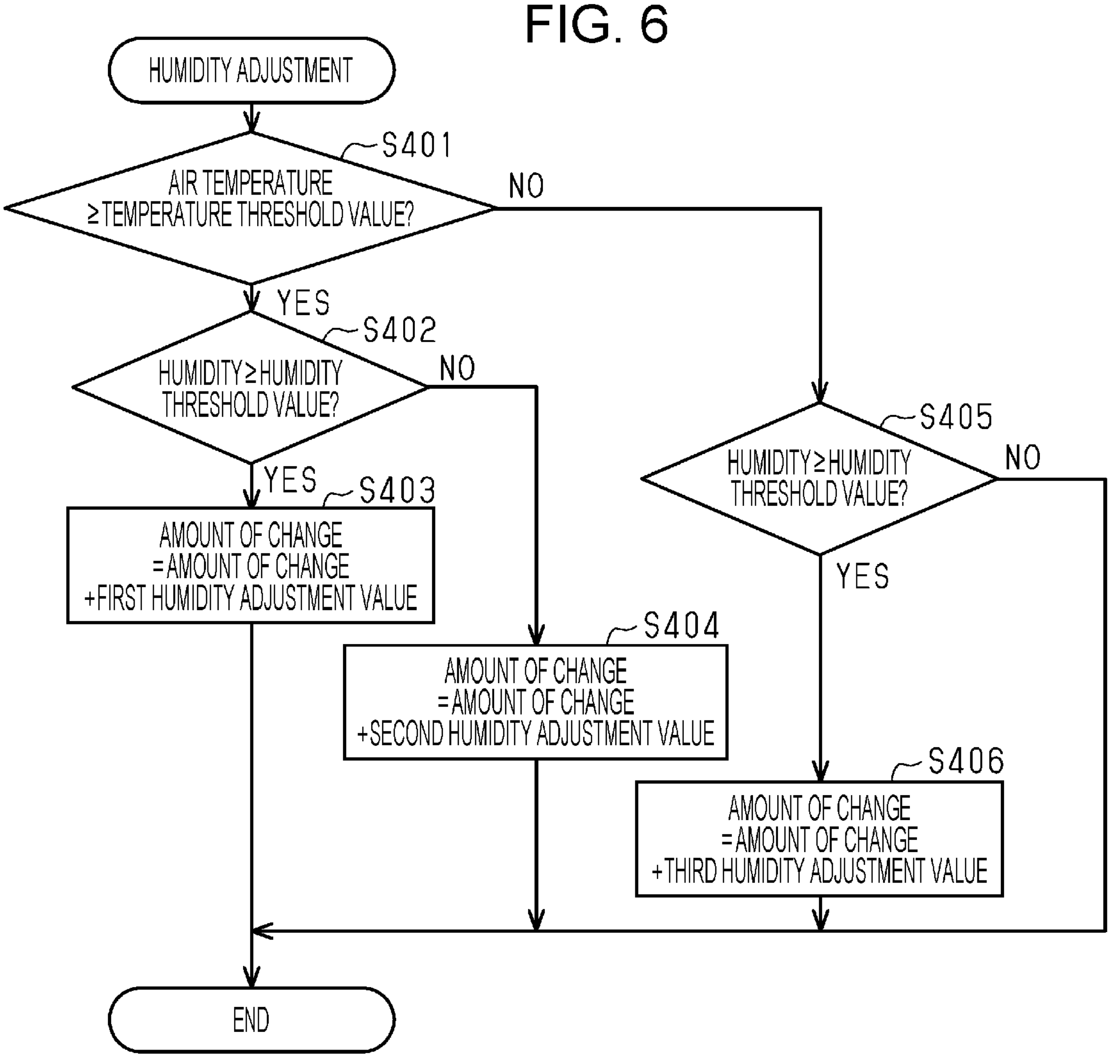
FIG. 6 is a flowchart showing a humidity adjustment subroutine performed by the alignment routine.

The humidity adjustment subroutine will be described with reference to the flowchart shown in FIG. 6. The air temperature threshold value and the humidity threshold value used for comparison in the humidity adjustment subroutine are set in advance from, for example, experimental results.

In step S401, the controller 38 compares the air temperature with the air temperature threshold value. When the air temperature is equal to or higher than the air temperature threshold value, step S401 is YES, and the controller 38 advances the process to step S402. When the air temperature is lower than the air temperature threshold value, step S401 is NO, and the controller 38 advances the process to step S405.

The controller 38 performs the same process in steps S402 and S405. Specifically, the controller 38 compares the humidity with the humidity threshold value. When the air temperature is equal to or higher than the air temperature threshold value and the humidity is equal to or higher than the humidity threshold value, steps S401 and S402 are YES. In step S403, the controller 38 adds the first humidity adjustment value to the amount of change.

When the air temperature is equal to or higher than the air temperature threshold value and the humidity is lower than the humidity threshold value, step S401 is YES and step S402 is NO. In step S404, the controller 38 adds a second humidity adjustment value to the amount of change.

When the air temperature is lower than the air temperature threshold value and the humidity is equal to or higher than the humidity threshold value, step S401 is NO and step S405 is YES. In step S406, the controller 38 adds a third humidity adjustment value to the amount of change. When the air temperature is lower than the air temperature threshold value and the humidity is lower than the humidity threshold value, steps S401 and S405 are NO, and the controller 38 ends the process.

Elapsed Time Adjustment Subroutine

Figure 7:
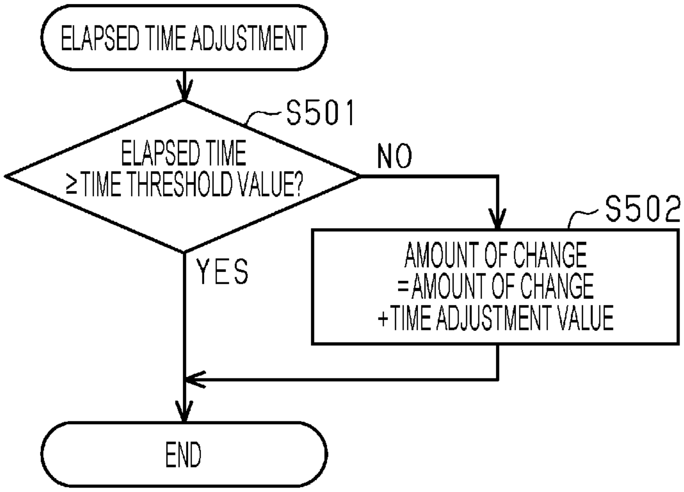
FIG. 7 is a flowchart showing an elapsed time adjustment subroutine performed by the alignment routine.

The elapsed time adjustment subroutine will be described with reference to the flowchart shown in FIG. 7. The time threshold value used for comparison in the elapsed time adjustment subroutine is set in advance from, for example, experimental results.

In step S501, the controller 38 compares the elapsed time with the time threshold value. When the elapsed time is equal to or greater than the time threshold value, step S501 is YES, and the controller 38 ends the process. When the elapsed time is shorter than the time threshold value, step S501 is NO, and the controller 38 advances the process to step S502. In step S502, the controller 38 adds the time adjustment value to the amount of change.

Adjustment of Standby Position

As shown in FIG. 2, the controller 38 changes the standby position WP by adjusting the amount of change with respect to the reference position. In the present embodiment, the distance between the transport unit 31 and the processing tray 24 means the distance from the lower end of the transport unit 31 to the processing tray 24 in the vertical direction Z. The distance between the transport unit 31 located at the reference position and the processing tray 24 is, for example, 10 mm. The maximum value of the amount of change is, for example, 70 mm. Second medium When the second recording density of the second medium **17*b* discharged from the first discharge unit 23 is larger than the second density threshold value, the controller 38 sets the amount of change to the maximum value. When the second medium 17*b* is subjected to single-sided recording, the underface recording density of the underface, which is a face on which recording is performed, is the second recording density. When the second medium 17*b* is subjected to double-sided recording, the larger one of the upperface recording density and the underface recording density is the second recording density. The second density threshold value is a preset value stored by the controller 38**, and is, for example, 70%.

TABLE 1

| Second recording density (Second density threshold value: 70%) | Amount of change |
|---|---|
| 71% to 100% | Maximum value (70 mm) |
| 0% to 70% | 0 mm |

As shown in Table 1, when the second recording density is larger than 70%, the controller 38 sets the amount of change to 70 mm. When the second recording density is 70% or less, the controller 38 sets the amount of change to 0 mm. That is, when the second recording density is equal to or lower than the second density threshold value, the controller 38 increases a distance between the standby position WP and the processing tray 24 based on the first recording density of the first medium **17*a* instead of the second recording density of the second medium 17*b*. Recording face of first medium When the first medium 17***a* is subjected to single-sided recording, and when the difference in density which is the difference between the upperface recording density and the underface recording density of the first medium 17*a* where both sides are recorded are smaller than the density difference threshold value, the controller 38 compares the first recording density with the first density threshold value.

When the first medium 17*a* is subjected to single-sided recording, the underface recording density of the underface, which is a face on which recording is performed, is the first recording density. When the first medium 17*a* is subjected to double-sided recording, the larger one of the upperface recording density and the underface recording density is the first recording density. The first density threshold value and the density difference threshold value are preset values stored by the controller 38. The first density threshold value is, for example, 70%. The density difference threshold value is, for example, 20%. The controller 38 increases a distance between the standby position WP and the processing tray 24 when the first recording density is equal to or higher than the first density threshold value, compared with when the first recording density is lower than the first density threshold value. That is, the controller 38 increases the amount of change in the standby position WP with respect to the reference position when the first recording density is equal to or higher than the first density threshold value, compared with when the first recording density is lower than the first density threshold value.

TABLE 2

| First recording density (First density threshold value: 70%) | Amount of change |
|---|---|
| 70% to 100% | First recording face adjustment value (3 mm) |
| 0% to 69% | 0 mm |

As shown in Table 2, when the first recording density is 70% or more, the controller 38 adds, for example, three mm, which is the first recording face adjustment value, to the amount of change. When the first recording density is less than 70%, the controller 38 sets the amount of change to 0 mm.

When the first medium 17*a* is subjected to double-sided recording and the difference in density which is the difference between the upperface recording density and the underface recording density of the first medium 17*a* are equal to or greater than the density difference threshold value, the controller 38 compares the upperface recording density with the underface recording density of the first medium 17*a*. When the underface recording density is higher than the upperface recording density by the density difference threshold value or more, the controller 38 increases a distance between the standby position WP and the processing tray 24. That is, the controller 38 increases the amount of change when the underface recording density is higher than the upperface recording density by the density difference threshold value or more than when the underface recording density is lower than the upperface recording density.

TABLE 3

| First recording density | Amount of change |
|---|---|
| Underface recording density > Upperface recording density | Second recording face adjustment value (2 mm) |
| Underface recording density < Upperface recording density | Third recording face adjustment value (1 mm) |

As shown in Table 3, when the underface recording density is higher than the upperface recording density, the controller 38 adds 2 mm, which is the second recording face adjustment value, to the amount of change. When the underface recording density is lower than the upperface recording density, the controller 38 adds one mm, which is the third recording face adjustment value, to the amount of change.

Number of First Media

The controller 38 adjusts the amount of change based on the stacked sheet number of the first media 17*a* placed on the processing tray 24. The controller 38 stores a stack threshold value, four sheet number density threshold values, and four sheet number adjustment values that are preset. The stack threshold value of the present embodiment is, for example, 30 sheets. The four sheet number adjustment values may be the same value or may be different values. The four sheet number adjustment values of the present embodiment are all 20 mm.

In the present embodiment, the sheet number density threshold value to be compared with the first recording density is changed according to the number of stacked sheets. That is, when the number of stacked sheets is equal to or less than the stack threshold value, the controller 38 compares the first recording density with the first sheet number density threshold value and the second sheet number density threshold value. When the number of stacked sheets is larger than the stack threshold value, the controller 38 compares the first recording density with the third sheet number density threshold value and the fourth sheet number density threshold value.

The first sheet number density threshold value is lower than the second sheet number density threshold value. The third sheet number density threshold value is lower than the first sheet number density threshold value. The fourth sheet number density threshold value may be higher than the first sheet number density threshold value and lower than the second sheet number density threshold value. In the present embodiment, the first sheet number density threshold value is 30%, the second sheet number density threshold value is 70%, the third sheet number density threshold value is 20%, and the fourth sheet number density threshold value is 60%.

TABLE 4

| First recording density (First sheet number density threshold value: 30%) (Second sheet number density threshold value: 70%) | Amount of change |
|---|---|
| 70% to 100% | First sheet number adjustment value + Second sheet number adjustment value (20 mm) + (20 mm) |
| 30% to 69% | First sheet number adjustment value (20 mm) |
| 0% to 29% | 0 mm |

Table 4 shows the case where the number of stacked sheets is equal to or less than the stack threshold value. That is, the number of stacked sheets is 1 to 30.

When the first recording density is 70% or more, the controller 38 adds 20 mm, which is the first sheet number adjustment value, and 20 mm, which is the second sheet number adjustment value, to the amount of change. That is, the controller 38 adds 40 mm to the amount of change.

When the first recording density is 30% or more and less than 70%, the controller 38 adds 20 mm, which is the first sheet number adjustment value. When the first recording density is less than 30%, the controller 38 sets the amount of change to 0 mm.

TABLE 5

| First recording density (Third sheet number density threshold value: 20%) (Fourth sheet number density threshold value: 60%) | Amount of change |
|---|---|
| 60% to 100% | Third sheet number adjustment value + Fourth sheet number adjustment value (20 mm) + (20 mm) |
| 20% to 59% | Third sheet number adjustment value (20 mm) |
| 0% to 19% | 0 mm |

Table 5 shows the case where the number of stacked sheets is larger than the stack threshold value. That is, the number of stacked sheets is 31 or more.

When the first recording density is 60% or more, the controller 38 adds 20 mm, which is the third sheet number adjustment value, and 20 mm, which is the fourth sheet number adjustment value, to the amount of change. That is, the controller 38 adds 40 mm to the amount of change.

When the first recording density is 20% or more and less than 60%, the controller 38 adds 20 mm, which is the third sheet number adjustment value. When the first recording density is less than 20%, the controller 38 sets the amount of change to 0 mm.

Humidity and Temperature

The controller 38 adjusts the amount of change based on the temperature and humidity. The controller 38 stores an air temperature threshold value, a humidity threshold value, and a plurality of humidity adjustment values that are preset. The air temperature threshold value of the present embodiment is 20° C. and the humidity threshold value is 45%. The controller 38 increases a distance between the standby position WP and the processing tray 24 when the humidity is equal to or higher than the humidity threshold value. That is, the controller 38 increases the amount of change when the humidity is equal to or higher than the humidity threshold value, compared with when the humidity is lower than the humidity threshold value.

TABLE 6

| Air temperature (Air temperature threshold value: 20° C.) | Humidity (Humidity threshold value: 45%) | Amount of change |
|---|---|---|
| 20° C. or higher | 45% or higher | First humidity adjustment value (3 mm) |
| | less than 45% | Second humidity adjustment value (2 mm) |
| less than 20° C. | 45% or higher | Third humidity adjustment value (1 mm) |
| | less than 45% | 0 mm |

As shown in Table 6, when the temperature is 20° C. or higher and the humidity is 45% or higher, the controller 38 adds, for example, three mm, which is the first humidity adjustment value, to the amount of change. When the temperature is 20° C. or higher and the humidity is less than 45%, the controller 38 adds, for example, two mm, which is the second temperature adjustment value smaller than the first humidity adjustment value, to the amount of change.

When the temperature is less than 20° C. and the humidity is 45% or more, the controller 38 adds, for example, one mm, which is the third humidity adjustment value smaller than the second humidity adjustment value, to the amount of change. When the temperature is less than 20° C. and the humidity is less than 45%, the controller 38 sets the amount of change to 0 mm.

Elapsed Time

The controller 38 adjusts the amount of change based on the elapsed time elapsed since performing recording on the first medium 17*a*. The controller 38 stores a time threshold value and a time adjustment value that are preset. The time threshold value of the present embodiment is one minute. When the elapsed time is shorter than the time threshold value, the controller 38 increases a distance between the standby position WP and the processing tray 24. That is, the controller 38 increases the amount of change when the elapsed time is shorter than the time threshold value, compared with when the elapsed time is equal to or longer than the time threshold value.

TABLE 7

| Elapsed time (Time threshold value: 1 minute) | Amount of change |
|---|---|
| 1 minute or more | 0 mm |
| less than 1 minute | Time adjustment value (1 mm) |

As shown in Table 7, when the elapsed time is one minute or more, the controller 38 sets the amount of change to 0 mm. When the elapsed time is less than one minute, the controller 38 adds, for example, one mm, which is a time adjustment value, to the amount of change.

Action of First Embodiment

As shown in FIG. 2, the controller 38 may stop the paddle 29 in the stop posture shown in FIG. 2 while the first discharge unit 23 discharges the second medium 17*b*. At this time, the controller 38 may position the transport unit 31 at the transport position TP. The transport unit 31 located at the transport position TP sandwiches the first medium 17*a* between the transport unit 31 and the processing tray 24. Therefore, it is possible to reduce the possibility that the first medium after alignment 17*a* is disturbed.

In the paddle 29 in the stopped posture, the blade 36 is located above the position between the pair of rollers in which the first discharge unit 23 discharges the second medium 17*b*. Therefore, the second medium 17*b* discharged from the first discharge unit 23 enters a space between the blade 36 and the processing tray 24.

For example, the controller 38 may determine that the second medium 17*b* has passed through the first discharge unit 23 when a state in which the detection unit 28 detects the second medium 17*b* changes to a state in which the detection unit 28 does not detect the second medium 17*b*. When the rear end of the second medium 17*b* in the first discharge direction D1 passes through the first discharge unit 23, the controller 38 causes the position changing unit 32 to move the transport unit 31 to the standby position WP. The standby position WP at this time is a position away from the processing tray 24 by the amount of change calculated with respect to the reference position.

For example, when the second recording density of the second medium 17*b* is less than the second density threshold value, the first recording density of the first medium 17*a* where recording is performed on one side is equal to or higher than the first density threshold value, the number of stacked sheets placed on the processing tray 24 is the stack threshold value, the air temperature is equal to or higher than the air temperature threshold value, the humidity is equal to or higher than the humidity threshold value, and the elapsed time is less than one minute, the amount of change is 47 mm. That is, the amount of change is the value obtained by adding three mm, which is the first recording face adjustment value, 20 mm, which is the first sheet number adjustment value, 20 mm, which is the second sheet number adjustment value, three mm, which is the first temperature adjustment value, and one mm, which is the time adjustment value. Therefore, the transport unit 31 located at the standby position WP is located at a position further 47 mm away from the reference position 10 mm away from the processing tray 24, that is, 57 mm away from the processing tray 24.

The controller 38 moves the transport unit 31 to the standby position WP and rotates the paddle 29 in the counterclockwise direction in FIG. 2. The rotating paddle 29 feeds the second medium 17*b* between the transport unit 31 located at the standby position WP and the processing tray 24.

Subsequently, the controller 38 causes the position changing unit 32 to move the transport unit 31 to the transport position TP. The transport unit 31 located at the transport position TP comes into contact with the upperface of the second medium 17*b* placed on the processing tray 24.

The controller 38 aligns the second medium 17*b* by rotating the transport unit 31 located at the transport position TP. In the present embodiment, the medium before alignment 17 is referred to as the second medium 17*b*, and the medium after alignment 17 is referred to as the first medium 17*a*. Therefore, the aligned first medium 17*a* is placed on the processing tray 24.

When the number of stacked sheets, which is the number of the first media 17*a* placed on the processing tray 24, is smaller than the number of sheets to be processed, which is a unit when performing a post-process, the controller 38 waits until the first discharge unit 23 discharges the next second medium 17*b*.

When the number of stacked sheets reaches the number of sheets to be processed, the controller 38 causes the post-processing device 14 to perform a post-process. The post-processing unit 33 of the present embodiment binds a plurality of first media 17*a* placed on the processing tray 24 with staples. The controller 38 causes the second discharge unit 25 to discharge the bundle of the first media 17*a* on the processing tray 24 to the stack tray 26.

The effects of the present embodiment will be described.

(1) The size of the curl of the first medium 17*a* placed on the processing tray 24 changes depending on the process with respect to the first medium 17*a*. The controller 38 changes the standby position WP of the transport unit 31 based on the processing information about the process performed on the first medium 17*a*. That is, the controller 38 is configured to cause the transport unit 31 to stand by at the standby position WP in consideration of the influence of the curl of the first medium after alignment 17*a* placed on the processing tray 24 on the second medium to be aligned 17*b* following the first medium 17*a*. Therefore, it is possible to reduce the possibility that the medium 17 hits the transport unit 31 located at the standby position WP and the image recorded on the medium 17 is damaged.

(2) The curl of the medium 17 tends to be large when the recording density is high, compared with when the recording density is low. In this respect, the controller 38 increases a distance between the standby position WP and processing tray 24 when the first recording density of the first medium 17*a* is equal to or higher than the first density threshold value, compared with when the first recording density is lower than the first density threshold value. That is, the standby position WP is away from the processing tray 24, so that even when the first medium 17*a* is curled, it is possible to reduce the possibility that the second medium 17*b* discharged onto the first medium 17*a* hits the transport unit 31 located at the standby position WP.

(3) The first medium 17*a* tends to have a large curl when the difference between the upperface recording density and the underface recording density is large, compared with when the difference is small. The way of curling depends on which of the upperface recording density or the underface recording density is higher. For example, when the underface recording density is lower than the upperface recording density, the first medium 17*a* tends to curl so that the central portion rises. When the underface recording density is higher than the upperface recording density, the first medium 17*a* tends to curl so that the end portion is raised. The curl that raises the central portion is not likely to increase due to the weight of the first medium 17*a*, whereas the curl that raises the end portion tends to be larger than the curl that raises the central portion. In this respect, the controller 38 increases a distance between the standby position WP and the processing tray 24 when the underface recording density is higher than the upperface recording density by the density difference threshold value or more. Therefore, even when the curl of the first medium 17*a* tends to be large, it is possible to reduce the possibility that the second medium 17*b* discharged on the first medium 17*a* hits the transport unit 31 located at the standby position WP.

(4) When the recording density is low, the curl is unlikely to increase. However, when the curl of the first medium 17*a* is large, the second medium 17*b* may hit the transport unit 31 even when the curl of the second medium 17*b* is small. In this respect, the controller 38 changes the standby position WP based on the first recording density even when the second recording density is equal to or lower than the second density threshold value. Therefore, it is possible to reduce the possibility that the second medium 17*b* hits the transport unit 31 located at the standby position WP.

(5) The second medium 17*b* discharged from the first discharge unit 23 is placed on the first medium 17*a* placed on the processing tray 24. Therefore, the number of the first media 17*a* affects the position of the second medium 17*b* with respect to the processing tray 24. The controller 38 changes the standby position WP based on the number of the first media 17*a*. Therefore, the transport unit 31 can be made to stand by at the standby position WP considering the position of the second medium 17*b* placed on the first medium 17*a*.

(6) In the case of the medium 17 that absorbs moisture, the water vapor in the air is absorbed by the medium 17, and the medium 17 may swell and undulate. When the medium 17 swells and undulates, the distance between the medium 17 and the transport unit 31 is short. The medium 17 is likely to absorb water vapor when the humidity is high, compared with when the humidity is low. In this respect, the processing information includes humidity information. The controller 38 is configured to change the standby position WP based on the humidity, and cause the transport unit 31 to stand by at the standby position WP in consideration of the influence of water vapor in the air.

(7) The medium 17 on which recording is performed may dry out over time and the curls may converge. The controller 38 changes the standby position WP based on the elapsed time since the recording unit 21 performed recording on the first medium 17*a*. That is, the transport unit 31 can be made to stand by at the standby position WP in consideration of the passage of time.

The present embodiment can be modified and implemented as follows. The present embodiment and the following modifications can be implemented in combination with one another as long as there is no technical contradiction.

- The processing information may include thickness information about the thickness of the medium 17. The thickness information may be a numerical value indicating the degree of thickness of the medium 17, or may be a basis weight of the medium 17. The controller 38 may decrease a stack threshold value or increase a sheet number adjustment value when the thickness of the medium 17 is large, compared with when the thickness is small.
- The processing information may include resolution information about the resolution of the image to be recorded. The size of each of the droplets ejected by the recording unit 21 is small and the number of droplets ejected is large when the resolution is high, compared with when the resolution is low. Therefore, when the resolution is high, the recording time required for recording is long, so that the transport time can be lengthened according to the recording time. Therefore, the controller 38 may make the amount of change of the standby position WP when the resolution is low and the transport time is short larger than the amount of change of the standby position WP when the resolution is high and the transport time is long.
- The processing information may include water vapor amount information about the amount of water vapor in the air. The amount of water vapor is the amount of water vapor per unit volume. The controller 38 may increase the amount of change of the standby position WP when the amount of water vapor in the air is equal to or greater than the water vapor threshold value, compared with when the amount of water vapor is lower than the water vapor threshold value. The controller 38 may calculate the amount of water vapor from the humidity. The controller 38 may calculate the amount of water vapor from the temperature and humidity. The water vapor threshold value may be a value calculated from the humidity threshold value and the air temperature threshold value.
- The controller 38 may control the position changing unit 32 based on at least one of the first recording density, the number of stacked sheets, the humidity, the air temperature, and the elapsed time, and change the standby position WP.
- The controller 38 may store a plurality of time adjustment values. For example, the controller 38 may add the first time adjustment value to the amount of change when the elapsed time is equal to or greater than the time threshold value, and may add the second time adjustment value larger than the first time adjustment value to the amount of change when the elapsed time is shorter than the time threshold value. The controller 38 may store a plurality of time threshold values and change the amount of change in a plurality of stages.
- The controller 38 may not consider the temperature when adjusting the amount of change based on the humidity.
- The controller 38 may store a plurality of humidity threshold values. The controller 38 may store a plurality of air temperature threshold values.
- The controller 38 may change the standby position WP based on the information about the process performed on the first medium 17*a* regardless of the second recording density of the second medium 17*b*.
- The second recording density of the second medium 17*b* may be the sum of the upperface recording density of the second medium 17*b* and the underface recording density of the second medium 17*b*. The second recording density may be the average of the upperface recording density of the second medium 17*b* and the underface recording density of the second medium 17*b*, or may be predetermined one of them.
- The first recording density of the first medium 17*a* may be the sum of the upperface recording density of the first medium 17*a* and the underface recording density of the first medium 17*a*. The first recording density may be the average of the upperface recording density of the first medium 17*a* and the underface recording density of the first medium 17*a*, or may be predetermined one of them.
- The first recording density used for comparison in the alignment routine may be the average of the respective first recording densities of the plurality of first media 17*a* placed on the processing tray 24.
- The controller 38 may change the standby position WP regardless of which of the underface recording density and the upperface recording density of the first medium 17*a* is higher. The controller 38 may increase the amount of change of the standby position WP when the upperface recording density is higher than the underface recording density, compared with when the upperface recording density is lower than the underface recording density.
- The first recording density may include the upperface recording density of the upperface of the first medium 17*a* and the underface recording density of the underface of the first medium 17*a*, and the controller 38 may increase the distance between the standby position WP and the processing tray 24 when the difference in density between the underface recording density and the upperface recording density is equal to or greater than the density difference threshold value.
- The first recording density may include the upperface recording density of the upperface of the first medium 17*a* and the underface recording density of the underface of the first medium 17*a*, and the controller 38 may increase the distance between the standby position WP and the processing tray 24 when the upperface recording density is higher than the underface recording density by the density difference threshold value or more.

When calculating the first recording density, the recording region of the medium 17 may be divided into a plurality of parts, and only part of them may be used. Specifically, the first recording density in the region where the first medium 17*a* and the transport unit 31 face each other may be calculated and used. The region where the first medium 17*a* and the transport unit 31 face each other may be a peripheral region including a position where the first medium 17*a* and the transport unit 31 face each other. The peripheral region here includes a position where the first medium 17*a* and the transport unit 31 face each other, and may be a region extending by a predetermined distance from the downstream end of the alignment direction D3 of the first medium 17*a* toward the second discharge direction D2. Then, the standby position WP of the transport unit 31 may be changed based on the first recording density calculated here.

In the following, technical ideas and their functions and effects which are grasped from the above-described embodiments and modifications will be described. (A) The post-processing device includes a discharge unit that discharges a medium on which recording is performed by a recording unit that performs recording by ejecting a liquid, a processing tray on which the medium discharged by the discharge unit is placed, an end alignment portion that is provided on the processing tray and aligns an end of the medium, a transport unit that comes into contact with an upperface of the medium placed on the processing tray and transports the medium to the end alignment portion, a position changing unit that changes a relative position of the transport unit with respect to the processing tray, a controller that controls the position changing unit, and a post-processing unit that performs a post-process on the medium on the processing tray, the position changing unit is configured to move the transport unit to a transport position to which the medium is transported and a standby position farther away from the processing tray than the transport position, the controller changes the standby position based on processing information about a process performed on the medium, and the processing information includes, among a first medium after alignment and a second medium before alignment, information about a process performed on the first medium.

The size of the curl of the first medium placed on the processing tray varies depending on the process for the first medium. According to this configuration, the controller changes the standby position of the transport unit based on the processing information about the process performed on the first medium. That is, the controller is configured to cause the transport unit to stand by at a standby position in consideration of the influence of the curl of the first medium after alignment placed on the processing tray on the second medium to be aligned following the first medium. Therefore, it is possible to reduce the possibility that the medium hits the transport unit located at the standby position and the image recorded on the medium is damaged.

(B) In the post-processing device, the processing information may include a first recording density of the first medium, and the controller may increase a distance between the standby position and the processing tray when the first recording density is equal to or higher than a first density threshold value, compared with when the first recording density is lower than the first density threshold value.

The curl of the medium tends to be large when the recording density is high, compared with when the recording density is low. In this respect, according to this configuration, the controller increases a distance between the standby position and processing tray when the first recording density of the first medium is equal to or higher than the first density threshold value, compared with when the first recording density is lower than the first density threshold value. That is, the standby position is away from the processing tray, so that even when the first medium is curled, it is possible to reduce the possibility that the second medium discharged onto the first medium hits the transport unit located at the standby position.

(C) In the post-processing device, the first recording density may include an upperface recording density of an upperface of the first medium and an underface recording density of an underface of the first medium, and the controller may increase a distance between the standby position and the processing tray when a difference in density between the underface recording density and the upperface recording density is equal to or greater than a density difference threshold value.

The first medium tends to have a large curl when the difference between the upperface recording density and the underface recording density is large, compared with when the difference is small. According to this configuration, the controller increases a distance between the standby position and the processing tray when the difference in density between the underface recording density and the upperface recording density is equal to or greater the density difference threshold value. Therefore, even when the curl of the first medium tends to be large, it is possible to reduce the possibility that the second medium discharged on the first medium hits the transport unit located at the standby position.

(D) In the post-processing device, the controller may increase a distance between the standby position and the processing tray when the underface recording density is higher than the upperface recording density by the density difference threshold value or more.

The way of curling depends on which of the upperface recording density or the underface recording density is higher. For example, when the underface recording density is lower than the upperface recording density, the first medium tends to curl so that the central portion rises. When the underface recording density is higher than the upperface recording density, the first medium tends to curl so that the end portion is raised. The curl that raises the central portion is not likely to increase due to the weight of the first medium, whereas the curl that raises the end portion tends to be larger than the curl that raises the central portion. In this respect, according to this configuration, the controller increases a distance between the standby position and the processing tray when the underface recording density is higher than the upperface recording density by the density difference threshold value or more. Therefore, even when the curl of the first medium tends to be large, it is possible to reduce the possibility that the second medium discharged on the first medium hits the transport unit located at the standby position.

(E) In the post-processing device, the processing information may include the second recording density of the second medium, and the controller may increase a distance between the standby position and the processing tray based on the first recording density when the second recording density is equal to or lower than the second density threshold value.

When the recording density is low, the curl is unlikely to increase. However, when the curl of the first medium is large, the second medium may hit the transport unit even when the curl of the second medium is small. In this respect, according to this configuration, the controller changes the standby position based on the first recording density even when the second recording density is equal to or lower than the second density threshold value. Therefore, it is possible to reduce the possibility that the second medium hits the transport unit located at the standby position.

(F) In the post-processing device, the processing information may include humidity information related to humidity, and the controller may increase a distance between the standby position and the processing tray when the humidity is equal to or higher than the humidity threshold value.

In the case of the medium that absorbs moisture, water vapor in the air may be absorbed by the medium, and the medium may swell and undulate. When the medium swells and undulates, the distance between the medium and the transport unit is shorter. The medium is likely to absorb water vapor when the humidity is high, compared with when the humidity is low. In this respect, according to this configuration, the processing information includes humidity information. The controller is configured to change the standby position based on the humidity, and cause the transport unit to stand by at the standby position in consideration of the influence of water vapor in the air.

(G) In the post-processing device, the processing information may include the elapsed time elapsed since the recording unit performed recording on the first medium, and the controller may increase a distance between the standby position and the processing tray when the elapsed time is shorter than the time threshold value.

The medium on which recording is performed may dry out over time and the curls may converge. According to this configuration, the controller changes the standby position based on the elapsed time since the recording unit performed recording on the first medium. That is, the transport unit can be made to stand by at the standby position in consideration of the passage of time.

What is claimed is:

1. A post-processing device comprising:

a discharge unit that discharges a medium on which a liquid is ejected and recording is performed;

a processing tray on which the medium discharged by the discharge unit is placed;

an end alignment portion that is provided on the processing tray and aligns an end of the medium;

a transport unit that comes into contact with an upperface of the medium placed on the processing tray and transports the medium to the end alignment portion;

a position changing unit that changes a relative position of the transport unit with respect to the processing tray;

a controller that controls the position changing unit; and a post-processing unit that performs a post-process on the medium on the processing tray, wherein the position changing unit is configured to move the transport unit to a transport position to which the medium is transported and a standby position farther away from the processing tray than the transport position, wherein the controller changes the standby position based on processing information about a process performed on the medium, and wherein the processing information includes, among a first medium after alignment and a second medium before alignment, information about a process performed on the first medium.

2. The post-processing device according to claim 1, wherein the processing information includes a first recording density of the first medium, and wherein the controller increases a distance between the standby position and the processing tray when the first recording density is equal to or higher than a first density threshold value, compared with when the first recording density is lower than the first density threshold value.

3. The post-processing device according to claim 2, wherein the first recording density includes an upperface recording density of an upperface of the first medium and an underface recording density of an underface of the first medium, and wherein the controller increases a distance between the standby position and the processing tray when a difference in density between the underface recording density and the upperface recording density is equal to or greater than a density difference threshold value.

4. The post-processing device according to claim 3, wherein the controller increases a distance between the standby position and the processing tray when the underface recording density is higher than the upperface recording density by the density difference threshold value or more.

5. The post-processing device according to claim 4, wherein the processing information includes a second recording density of the second medium, and wherein the controller increases a distance between the standby position and the processing tray based on the first recording density when the second recording density is equal to or lower than a second density threshold value.

6. The post-processing device according to claim 2, wherein the processing information includes humidity information about humidity, and wherein the controller increases a distance between the standby position and the processing tray when the humidity is equal to or higher than a humidity threshold value.

7. The post-processing device according to claim 2, wherein the processing information includes an elapsed time elapsed since a recording unit performed recording on the first medium, and wherein the controller increases a distance between the standby position and the processing tray when the elapsed time is shorter than a time threshold value.

* * * * *